Patented Apr. 29, 1952

2,594,353

UNITED STATES PATENT OFFICE 2,594,353

SOLUTIONS OF POLYMERS OF VINYLIDENE CYANIDE IN ALKYL ESTERS OF PHOSPHORIC ACID

Richard F. Schmidt, Cuyahoga Falls, Ohio, assignor to The B. F. Goodrich Company, New York, N. Y., a corporation of New York No Drawing. Application January 7, 1950, Serial No. 137,479

6 Claims. (Cl. 260—30.6)

This invention relates to novel polymer solutions and pertains more particularly to solutions of polymers of vinylidene cyanide in alkyl esters of phosphoric acid.

A copending application, Serial No. 11,336, filed February 26, 1948 now U. S. Patent No. 2,589,294, describes methods for the preparation of highly useful polymers of vinylidene cyanide and discloses that polyvinylidene cyanide of molecular weight in excess of 25,000 is capable of being used to form excellent synthetic fibers, films and filaments. However, only a very few solvents for this high molecular polyvinylidene cyanide are known it being insoluble in almost all of the solvents ordinarily employed in dissolving high polymers including alcohols, carboxylic acids and their esters, ketones, hydrocarbons, chloro and nitro substituted hydrocarbons and the like.

Accordingly it is an object of this invention to provide a new class of solvents for polymers of vinylidene cyanide suitable for forming polymer solutions from which excellent filaments, films and the like may be prepared. Other objects will be apparent hereinafter.

It has now been discovered that the above and other objects are attained by the use of alkyl esters of phosphoric acid as solvents for the polymers of vinylidene cyanide. Polymer solutions are thereby obtained which have the desired viscosity for the spinning of filaments and the casting of films. Moreover, the films and filaments prepared from such solutions possess many valuable properties including high tensile strength and excellent resistance to the action of chemicals. The alkyl phosphates are especially valuable solvents since they are economically obtained in large quantities and because they are readily soluble in water, of low toxicity, and do not hydrolyze.

The esters of phosphoric acid which are useful solvents for polymers of vinylidene cyanide possess the formula

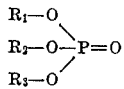

wherein $R_1$ is an alkyl radical containing from 1 to 3 carbon atoms and each of $R_2$ and $R_3$ is a member of the class consisting of hydrogen and alkyl radicals containing from 1 to 3 carbon atoms. Included within this class of esters are monoalkyl phosphates such as methyl phosphate, ethyl phosphate and propyl phosphate; dialkyl phosphates such as dimethyl phosphate, diethyl phosphate, dipropyl phosphate, methyl ethyl phosphate, methyl propyl phosphate and ethyl propyl phosphate; and trialkyl phosphates such as trimethyl phosphate, triethyl phosphate, tripropyl phosphate, diethyl methyl phosphate, dipropyl ethyl phosphate and the like. The preferred alkyl phosphates for use as solvents for polymers of vinylidene cyanide are those which contain from 1 to 6 carbon atoms, especially trimethyl and triethyl phosphate.

No special conditions or precautions are necessary in preparing the polymer solutions of this invention. Solutions may be made either by adding the polymer to the solvent or by reversing the order of addition. Solution of the polymer occurs at room temperature but is much more readily effected by heating the polymer-solvent mixture to a temperature of about 50° C. to 70° C.

It has been found desirable that the polymer solutions be stabilized against possible polymer chain degradation if they are to be kept for appreciable lengths of time before use. Suitable stabilizers include the oxides of sulfur, and especially sulfur dioxide, as well as organic acid anhydrides. The use of a stabilizer is not a critical expedient however, for the solutions of vinylidene cyanide polymers in alkyl phosphates remain relatively stable for a period of several days even when no stabilizing substance is present.

Solutions having any desired polymer concentration may be prepared since the solvent and the polymer seem to be miscible with one another in all proportions. However, solutions containing less than 30%, and especially from about 8% to 20% by weight of polymer are preferred for use as spinning or casting solutions.

The preparation of polymer solutions in accordance with the present invention as well as the use of such solutions in the spinning of filaments is more fully described in the following examples, wherein all parts are by weight.

Example I 0.05 part of a fiber-forming polymer of vinylidene cyanide is added to 0.35 part of triethyl phosphate. The mixture is gently warmed for about five minutes whereupon a clear, syrupy, viscous solution suitable as a spinning solution is formed.

Example II

Example I is repeated using trimethyl phosphate in place of triethyl phosphate and a clear syrupy viscous solution suitable for spinning is again obtained.

Example III

A spinning solution is prepared by dissolving 0.5 part of polyvinylidene cyanide of molecular weight considerably above 25,000 in 4.0 parts of triethyl phosphate. To this solution 0.5 part of a mixture of triethyl phosphate and sulfur dioxide (.168 part of sulfur dioxide for each 1.406 part of triethyl phosphate) is added. The resulting solution is water white and of a viscosity suitable for spinning. This solution is spun into a glycerin bath maintained at a temperature of 135° C. to give a strong, lustrous filament.

Example IV

A 12.5% solution is prepared by dissolving a fiber-forming vinylidene cyanide polymer in triethyl phosphate. The solution is spun at a rate of 44 inches per minute into a water bath maintained at 80° C. and wound onto a take-up bobbin at 276 inches per minute. The resulting filament is quite useful as a textile fiber.

Example V 0.1 part of a polymer of vinylidene cyanide of a molecular weight considerably above 50,000 is dissolved in 14.06 parts of triethyl phosphate which is heated to 70° C. The solution is of a viscosity suitable for spinning. After six days, the solution is less viscous but remains sufficiently viscous for the spinning of filaments and the casting of films.

When the above examples are repeated using other alkyl phosphates, for example, methyl phosphate and dipropyl phosphate the solutions obtained are in general equivalent to the solutions of the examples.

As disclosed herein, alkyl phosphates are useful for dissolving any of the polymers of vinylidene cyanide including not only homopolymers but also copolymers of vinylidene cyanide with materials copolymerizable therewith such as styrene and substituted styrenes, vinyl esters, vinylidene monomers and the like. Also, the alkyl phosphate solvents of the present invention may be utilized in admixture with other solvents such as acetone or methyl ethyl ketone, which in themselves are not solvents for polymers of vinylidene cyanide, but which, together with alkyl phosphates in amounts as little as 20% by volume or even less form excellent solvent mixtures. For example, a mixture of 60 volumes of acetone and 40 volumes of triethyl phosphate readily dissolves vinylidene cyanide polymers to form valuable spinning and casting solutions.

Although specific examples of the invention have been described herein, it is not intended to limit the invention thereto, for numerous modifications will be apparent to those skilled in the art and are included within the scope of the appended claims.

I claim:

1. A solution of a polymer of vinylidene cyanide in a solvent comprising a compound of the formula

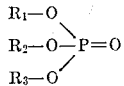

wherein $R_1$ is an alkyl radical containing from 1 to 3 carbon atoms and each of $R_2$ and $R_3$ is selected from the class consisting of hydrogen and alkyl radicals containing from 1 to 3 carbon atoms.

2. A solution of a polymer of vinylidene cyanide, said polymer possessing a molecular weight in excess of 25,000, in a compound of the formula

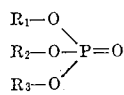

wherein $R_1$ is an alkyl radical containing from 1 to 3 carbon atoms and $R_2$ and $R_3$ are selected from the class consisting of hydrogen and alkyl radicals containing from 1 to 3 carbon atoms.

3. A solution suitable for the spinning of filaments and the casting of films, said solution comprising from 8% to 20% by weight of a polymer of vinylidene cyanide, said polymer possessing a molecular weight in excess of 25,000, dissolved in a compound of the formula

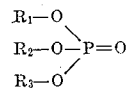

wherein $R_1$ is an alkyl radical containing from 1 to 3 carbon atoms, and $R_2$ and $R_3$ are selected from the class consisting of hydrogen and alkyl radicals containing from 1 to 3 carbon atoms.

4. A solution of polyvinylidene cyanide in triethyl phosphate.

5. A solution of polyvinylidene cyanide in trimethyl phosphate.

6. A solution suitable for the spinning of filaments and the casting of films, said solution comprising from 8% to 20% by weight of a polymer of vinylidene cyanide possessing a molecular weight in excess of 25,000, dissolved in triethyl phosphate.

RICHARD F. SCHMIDT.

REFERENCES CITED

The following references are of record in the file of this patent:

UNITED STATES PATENTS

| Number | Name | Date |
| --- | --- | --- |
| 2,417,294 | D'Alelio | Mar. 11, 1947 |
| 2,466,395 | Dickey | Apr. 5, 1949 |